March 22, 1955   J. H. FOX   2,704,547
CONTROL APPARATUS
Filed April 5, 1951

INVENTOR.
JOHN H. FOX
BY George H. Fisher
ATTORNEY.

United States Patent Office 2,704,547
Patented Mar. 22, 1955

2,704,547

CONTROL APPARATUS

John H. Fox, Toronto, Ontario, Canada, assignor to Minneapolis-Honeywell Regulator Company, Minneapolis, Minn., a corporation of Delaware Application April 5, 1951, Serial No. 219,371

8 Claims. (Cl. 137—219)

The present invention relates to an improved valve for controlling high velocity air flow.

While dampers have generally been used to control air flow in air conditioning systems, the slightly higher pressures and much greater air velocities now being used tend to require valves for proper control but, because of the sizes involver, conventional valves are prohibited in cost and cannot be used in many cases and, even where cost is not object, some types of conventional valves cause too much noise to be used. The present valve is low in cost because the body is formed of sheet metal stampings, noise is kept to a low level by the curved contours of the body and the associated elements, and good control is effected by coaction of the axially movable valve member and a unitary valve seat ring. In addition, by a judicious use of sealing means and by making the valve seat ring adjustable, assembly is easily effected, with assembly or disassembly being permissible even after the duct work is in place. In addition, minimum flow characteristics can be built into the valve by adjustment of the valve seat ring away from the valve member.

It is therefore an object of this invention to provide a valve having the advantages above discussed, as well as other features which will appear as this disclosure proceeds.

Figure 1:
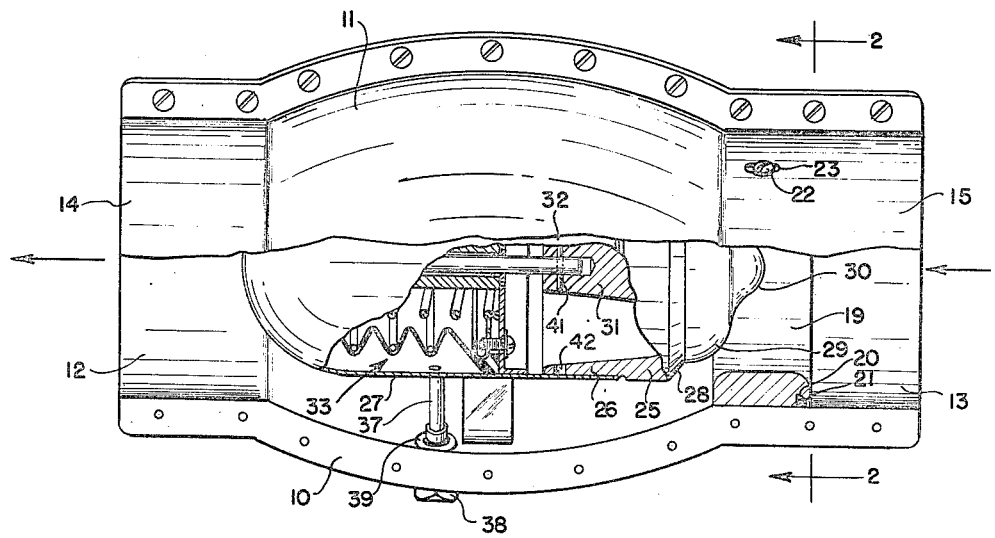
Figure 1 shows a plan view of the valve with parts broken away and parts in partial section.
Figure 2:
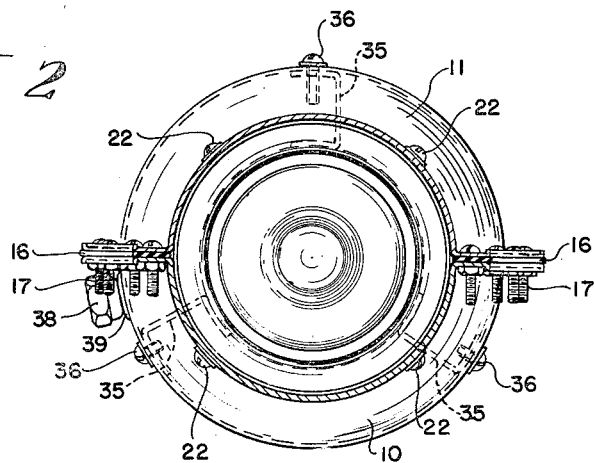
Figure 2 is taken on the line 2—2 of Figure 1.

The present valve comprises a body formed of two sheet-metal stampings 10 and 11 bolted together, each of the halves 10 and 11 comprising a flanged substantially semi-cylidrical member with an enlarged or bulged central portion and end collar portions 12 and 13 and 14 and 15, respectively. Each of members 10 and 11 is symmetrical about a longitudinal axis and they are, in fact, duplicate stampings. As shown in Figure 1, collar portions 13 and 15 are slightly longer than portions 12 and 14, and halves 10 and 11 are assembled with the matching collar portions together. As shown in Figure 2, suitable gaskets 16 are arranged between the attaching flanges of the stampings 10 and 11, the stampings being formed so that, with the gaskets in place, the resulting body is as circular in section as the process of forming permits. Any conventional bolting arrangement is suitable, ordinary bolts and nuts being used in the present example. Note that the bolts 17 are longer than appears necessary, this added length being, however, of considerable assistance when assembling the valve in place about duct work.

The stationary member or seat portion of the valve is constructed in the form of an integral ring 19, preferably cast, and is attached to the valve body in the collar portion formed by the portions 13 and 15. A groove 20 is cut in the periphery of ring 19 and locates an O sealing ring 21 which serves to seal the ring 19 relative to the body stampings and also seals the crevices that tend to exist between the stampings and the gasket 16. By effectively sealing the spaces between the ring 19 and the body stampings, leakage is minimized, as is noise which might result from such leakage. Ring 19 is secured in place by screws 22 extending through slots 23 in the stampings and into tapped holes in the ring. By securing ring 19 in place by screws extending through slots, the ring is easily aligned so that its seat portion is perpendicular to the line of movement of the movable valve member and, if desired, the adjustment means thus provided may also be used to permit moving the seat away from the normal closing position of the valve member to thereby prevent a full closing of the valve and thus provide minimum flow characteristics. To prevent leakage through the slots, either gaskets or a suitable sealing cement, not shown, may be used, the cement being preferred because it also tends to retain the screws 22.

Movable valve member 25 has a guide portion 26 slidably fitting in a stamped housing member 27. In addition, the member 25 has a seating portion 28 and curved throttling portion 29, with the upstream face 30 of the plug being streamlined to minimize turbulence. A central boss 31 is formed on the inside of member 25 and is drilled to receive rod 32 of pneumatic motor 33, motor 33 being attached to the inside of housing 27 by suitable screws, not shown. While any suitable motor may be used for moving valve member 25, a pneumatic bellows motor of the sort shown in Patent 2,372,273, issued March 27, 1945, is preferred. The movable valve member 25 and its housing 27 are centrally located within the valve body and are held in alignment by strut members 35 welded to housing 27 and bolted to the body stampings 10 and 11. Note that the screw 36 which extends through portion 11 is also elongated to facilitate the assembly of the valve. The space between the housing 27 and the diaphragm motor is connected to the outside by a suitable tube 37 and a fitting 38, with a rubber grommet 39 being used to seal the space between the fitting and the stamping 10 through which the fitting extends. Motor rod 32 is secured to boss 31 of valve member 25 by a knurled pin 41 driven through a suitable hole in the boss 31 and a matching hole in the motor rod.

In assembling the valve, it appears that very little question is involved in the procedure but, for clarity, it will be briefly reviewed. Preferably, the first assembly step is to weld the struts 35 to housing 27, with tube 37 also being secured in place. Thereafer, motor 33 is secured in place and the an air line is attached to tube 37 and a suitable air pressure, such as 15 pounds per square inch, is applied so that motor rod 32 is extended a maximum distance. Then, movable valve member 25 is pushed over the end of the motor rod and pin 41 is inserted through hole 42 and inserted in the matching holes in boss 31 and motor rod 32, the knurled pin then being tightly driven in place. Thereafter, the air pressure is relieved, permitting the spring of the motor to retract valve member 25 a maximum amount. The motor and movable valve member assembly is then attached to stamping 10 by screws, the tube 37 being extended toward a hole in stamping 10. Then, a grommet is pushed up over the tube and the fitting 38 is pushed over the tube and soldered in place with the grommet then being worked down into position to seal the space between the fitting and the tube. Then, ring 19 is secured to collar portion 13 of stamping 10, with O ring 21 being located in groove 20. Also, for convenience, gaskets 16 are placed on the flanges of member 10 and cemented in place, with suitable holes in the gaskets matching those in the flanges. At this stage, stamping 11 may be placed over the assembly and its flanges bolted to the flanges of stamping 10 and screw 36 attached to its strut 35 to prepare the valve for shipping, display, or the like or the valve may have its assembly completed on the conduits with which it is to be associated. Ordinarily, relatively soft roubber band sealing means are first placed over the ends of the conduits and the valve then assembled over these conduit ends and their sealing means, the relatively long screws permitting the halves to be attached together and then uniformly tightened up to give a secure and convenient assembly. Because the body is split longitudinally, and permits assembly on the conduits while they are in place, it also permits disassembly in the event that servicing should require such disassembly, without interfering with the conduits. This is an important factor in apparatus of this sort when it is realized that much of the conduit work and mechanism of an air conditioning system is imbedded in walls and very difficult of access.

As previously mentioned, because valve seat ring 19 is slidably adjustable, it may be adjusted for normal closure or it may be so adjusted that the valve can never be entirely turned off, this adjustment being made by sliding the seat forward or backward in its collar portion. Movable member 25 is shown in its retracted position, this position being limited by the edge of member 27 engaging the end of the guide portion 26 of the valve member, and the extension of member 25 is also limited by stop means incorporated in the motor, not shown, so that, by locating the ring slightly beyond the most remote position of member 25, the valve can never completely close.

In operation, the valve is preferably placed so that the movable member 25 faces upstream and closes against the pressure. The mode of operation, as more or less described already, with air pressure in the space between the housing 27, the diaphragm motor 33 overcomes the spring in the motor and pushes the motor rod 32 and its attached valve member to the right in a valve closing direction as the pressure increases and, upon a pressure decrease, the spring is able to oppose the air pressure and move the attached members to the left toward the fully open position shown.

While Figures 1 and 2 represent a preferred embodiment of the present invention, it is obvious that many modifications and substitutions will readily appear to those skilled in this art, hence the scope of this invention should be determined only by the appended claims.

I claim as my invention:

1. A valve for controlling air flow in high velocity air conditioning ducts comprising a flanged sheet metal body having sockets for receiving the ends of the ducts to which the valve may be connected, the body and sockets being constructed of a pair of essentially similar detachably connected flanged sheet metal stampings each having a generally semi-cylindrical shape with an enlarged central portion, guide means attached to at least one of the said stampings, a movable valve member guided by said means, a unitary valve seat ring adjustably attached to said stampings adjacent one of said sockets and arranged to coact with said movable member for controlling flow through said valve, the attaching means for said valve seat ring comprising screws threaded into said ring and coacting with slots formed in said stampings, gasket means between the flanges of said stampings, an outer groove in said valve seat ring, and a flexible O ring in said groove to effect a seal between said ring and said stampings and gasket means.

2. A valve for controlling high velocity air comprising a body formed of a pair of similar flanged concave sheet metal members detachably connected together, the flanges extending in a plane parallel to the axis of the valve, an integral valve seat ring attached to said members and arranged transverse to said axis, a guide means arranged within said body parallel to said axis, a movable valve member movable along said guide means toward engagement with said valve seat ring, said valve seat ring being adjustable sufficiently to insure its seating portion being perpendicularly disposed relative to the line of movement of said valve member, the means attaching said valve seat ring to said members comprising screws and slots, means for operating said valve member for thereby controlling air flow through said valve seat ring, and sealing means between said ring and said flanged body members for preventing flow around said ring.

3. A valve for controlling low pressure high velocity air comprising a body formed of a pair of similar flanged concave sheet metal members detachably connected together, the flanges extending in planes parallel to the axis of the valve, an integral valve seat ring adjustably attached to said members and arranged transverse to said axis, a guide means arranged within said body parallel to said axis, a movable valve member movable along said guide means toward engagement with said valve seat ring, means adjustably relating said movable valve member and the valve seat ring to establish a desired seating condition, said ring being adjustable both angularly and along the axis of the valve, means for operating said valve member for thereby controlling air flow through valve seat ring, sealing means between said flanges, and additional sealing means between said ring and said flanged body members for preventing flow around said ring.

4. An air conditioning valve comprising a body formed of a pair of similar flanged concave sheet metal members attached together, the flanges extending in a plane parallel to the axis of the valve, an integral valve seat ring adjustably attached to said members in a manner to permit it to be easily aligned transverse to said axis, the means attaching said ring to said members comprising screws arranged transverse to the axis of said valve, a guide means arranged within said body parallel to said axis, a movable valve member movable along said guide means toward engagement with said valve seat ring, means for operating said valve member for thereby controlling air flow through said valve seat ring, gasket sealing means between said flanges, and additional flexible sealing means between said ring and said flanged body members for preventing flow around said ring without interfering with the adjustment of said ring.

5. A low pressure valve for air conditioning apparatus comprising a sheet metal body formed of a pair of similar flanged concave members attached together, the flanges extending in a plane parallel to the axis of the valve, an integral valve seat ring adjustably attached to said members and arranged transverse to said axis, said ring being angularly movable and shiftable along said axis, a guide means arranged within said body parallel to said axis, a movable valve member movable for a limited distance along said guide means toward engagement with said valve seat ring, said ring being shiftable to a position wherein the valve member cannot close against it thereby insuring a predetermined minimum flow capacity, means for operating said valve member for thereby controlling air flow through said valve seat ring, gasket sealing means between said flanges, and additional flexible sealing means between said ring and said flanged body members for preventing flow around said ring without interfering with the adjustment of said ring.

6. A valve for air conditioning apparatus comprising a sheet metal body formed by two symmetrical stampings having outwardly projecting flanges extending parallel to the axis of the body, each of said stampings including an enlarged central portion and semi-cylindrical end portions, means extending through said flanges for holding said stampings together, sealing means between the flanges, a valve seat ring arranged in one of the end portions of said body, means for adjustably aligning said ring relative to said stampings, flexible sealing means arranged between said ring and said stampings, an axially movable valve member in said body portion and movable toward and away from seating engagement with said ring, cylinder means for axially guiding said member, and pneumatic motor means within said cylinder for operating said valve member.

7. A valve for controlling air flow in high velocity air conditioning ducts comprising a longitudinally divided sheet metal body having sockets for receiving the ends of the ducts to which the valve may be connected, the body and sockets being constructed of a pair of longitudinaly extending similar detachably connected sheet metal stampings each having a generally semi-cylindrical cross sectional shape with an enlarged central portion, guide means attached to at least one of said stampings, a movable valve member guided by said means, a unitary valve seat ring, and adjustable means engaging the periphery of said valve seat ring and stampings for altering the direction of the longitudinal axis of the valve seat ring relative to the direction of movement of the valve member.

8. A valve for controlling air flow in high velocity air conditioning ducts comprising a longitudinally divided sheet metal body having sockets for receiving the ends of the ducts to which the valve may be connected, the body and sockets being constructed of a pair of longitudinally extending detachably connected sheet metal stamping each having a generally semi-cylindrical cross sectional shape with an enlarged central portion, guide means attached to at least one of said stampings, a movable valve member guided by said means, a unitary valve seat ring, adjustable supporting means between adjacent surfaces of said valve seat ring and said stampings, said supporting means comprising members on said valve seat ring and engageable means for said members provided by said stampings to enable longitudinal but limited angular movement of the valve seat ring, and means accessible from the exterior of the stampings for holding said valve seat ring in a selected longitudinal position.

References Cited in the file of this patent

UNITED STATES PATENTS

| 227,943 | Wood | May 25, 1880 |
| 890,712 | Rose | June 16, 1908 |

(Other references on following page)

UNITED STATES PATENTS

| | | |
|---|---|---|
| 1,387,446 | Astier | Aug. 16, 1921 |
| 1,783,281 | Cox | Dec. 2, 1930 |
| 1,936,650 | Wade | Nov. 28, 1933 |
| 1,999,496 | Adams | Apr. 30, 1935 |
| 2,263,750 | Willke | Nov. 25, 1941 |
| 2,350,905 | Koehler | June 6, 1944 |
| 2,442,625 | Thomas | June 1, 1948 |
| 2,602,631 | Eickmeyer | July 8, 1952 |

FOREIGN PATENTS

| | | |
|---|---|---|
| 70,486 | Switzerland | 1914 |
| 262,594 | Great Britain | Dec. 26, 1926 |